United States Patent [19]

Dunn

[11] 3,721,764

[45] March 20, 1973

[54] AUDITORY TEST FACILITY WITH MULTISTAGE SINGLE SIDEBAND HETERODYNING

[75] Inventor: Cletus M. Dunn, Waterford, Conn.

[73] Assignee: The United States of America as represented by the Secretary of the Navy

[22] Filed: Jan. 14, 1970

[21] Appl. No.: 2,761

[52] U.S. Cl. .................................... 179/1 N, 324/79
[51] Int. Cl. .............................................. A61b 5/12
[58] Field of Search......... 179/1 N; 181/.5 G; 331/40, 331/41, 44; 324/79; 325/431, 432

[56] References Cited

UNITED STATES PATENTS

| | | | |
|---|---|---|---|
| 3,404,235 | 10/1968 | Goldberg | 179/1 N |
| 2,869,666 | 1/1959 | Webster | 181/.5 G |
| 3,105,193 | 9/1963 | Denton | 324/79 |
| 2,533,667 | 12/1950 | Harrison | 179/1 N |
| 2,777,953 | 1/1957 | Tollefson | 331/44 |

Primary Examiner—Kathleen H. Claffy
Assistant Examiner—Jon Bradford Leaheey
Attorney—Richard S. Sciascia, Louis B. Applebaum and Arthur L. Bowers

[57] ABSTRACT

A facility for testing auditory characteristics of any person, but particularly a sonarman, and including a hi-fi speaker-equipped sound insulated chamber for the test candidate and a hi-fi speaker-equipped test post for an acoustician, a hi-fi audio amplifier for the speakers, an intercom linking the sound insulated chamber and the testing position, a source of tonal sound and of noise and including controls at the test post, a pitch changing circuit coupled to the audio amplifier and pitch deviation metering circuit including dependent pitch controls in the chamber and at the testing post coupled to pitch changing circuit plush a pitch deviation meter at the test post. A switch at the test pose enables the acoustician to coupled the source of tonal sound wither to the test chamber directly or indirectly via the pitch changing and pitch deviation metering circuit.

4 Claims, 2 Drawing Figures

AUDITORY TEST FACILITY WITH MULTISTAGE SINGLE SIDEBAND HETERODYNING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

A sonar listening operator requires good hearing ability generally and more particularly he requires pycho-acoustic ability to compare a tone he hears to one heard recently and to judge whether they are identical, or to perceive a slight Doppler shift upward or downward that should indicate to the sonarman decreasing or increasing range between his listening platform and the source of the sound. Since there may be considerable noise or other tones time-coincident with the specific tone of interest at any particular time he must demonstrate ability to mentally isolate the tonal sound of interest in the presence of such interference and he must be able to do so for differential thresholds between the selected pure tone and the intereference that test meaningfully the candidates sensitivity to the selected pure tone.

More generally, the invention is for testing anyone that needs to have absolute pitch, i.e., ability to discriminate between true tones and offset tones or at least satisfactory sensitivity to selected tones. Also this invention can be used for audiogrammetric analysis which is required of some individuals to ascertain their hearing qualification for certain jobs.

Pitch discrimination of pure tones has received considerable attention in the literature on the psychophysics of audition. One technique known in the art calls upon the test candidate to establish and maintain a zero beat frequency between tones. Another technique known in the art is to generate a tone and measure listener's hearing threshold to that one. Another technique calls upon the test candidate to listen to two tones and to judge whether they are at the same pitch and if not at the same pitch which of the two is at the higher pitch and which is at the lower pitch. Though trained listeners are able to perceive a smaller frequency difference than untrained listeners, it is not uncommon for trained listeners to manifest idiosyncrasies at particular frequencies. Notwithstanding the utility of the auditioning techniques known in the art, they do not afford the acoustician sufficient capability to observe and measure a listener's ability to judge trueness of tone, and more particularly to judge a candidates qualifications for the duties of sonarman and other specialized jobs for which pitch discrimination is essential.

SUMMARY OF THE INVENTION

An acoustician couples a selected tone into a soundproof chamber occupied by a test candidate. After he terminates the tone, the acoustician couples the same tone, in combination with background noise and/or with one or more interfering tones, into a multistage heterodyning circuit. The oscillator of the last stage of the heterdyning circuit is independently adjustable from within the soundproof chamber and from the acoustician's post. At a particular frequency of the oscillator of the last stage of the heterodyning circuit, the output coupled into the soundproof chamber is the same as the input. A frequency measuring instrument is connected in the circuit and delivers to a meter at the acoustician's post an indication of the frequency shift between the heterodyning circuit input and the soundproof chamber. The test candidate adjusts the frequency control in the soundproof chamber until he recognizes the tone he heard initially. An intercom between test candidate and acoustician enables the test candidate to state when he is satisfied with his setting and enables the acoustician to issue instructions to the test candidate as the test progresses. Also, the acoustician can ask the test candidate to listen to the correct tone which he derives by adjusting his own control under the guidance of the meter so that the test candidate may compare the correct tone with the tone he thought was correct. Multichannel tapes under the control of a selector switch arrangement at the acousticians post may be used for providing the signals for the test.

DESCRIPTION OF A PREFERRED EMBODIMENT

Figure 1:
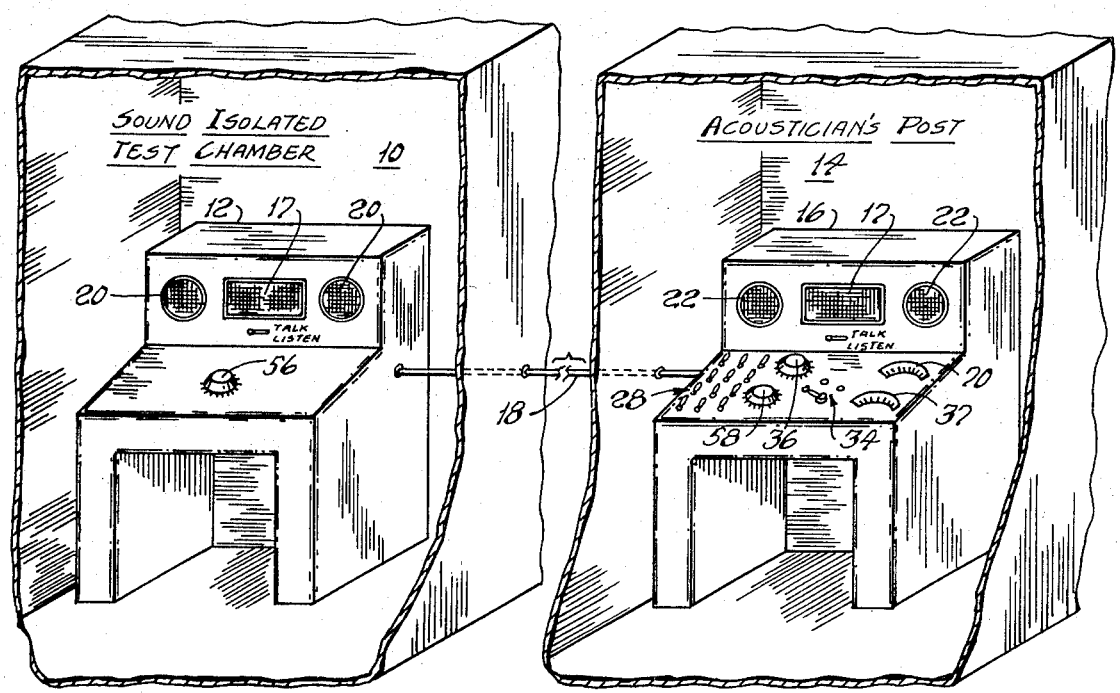
FIG. 1 shows in block form a test candidate's chamber and an acoustician's post electrically coupled for carrying out auditory tests.
Figure 2:
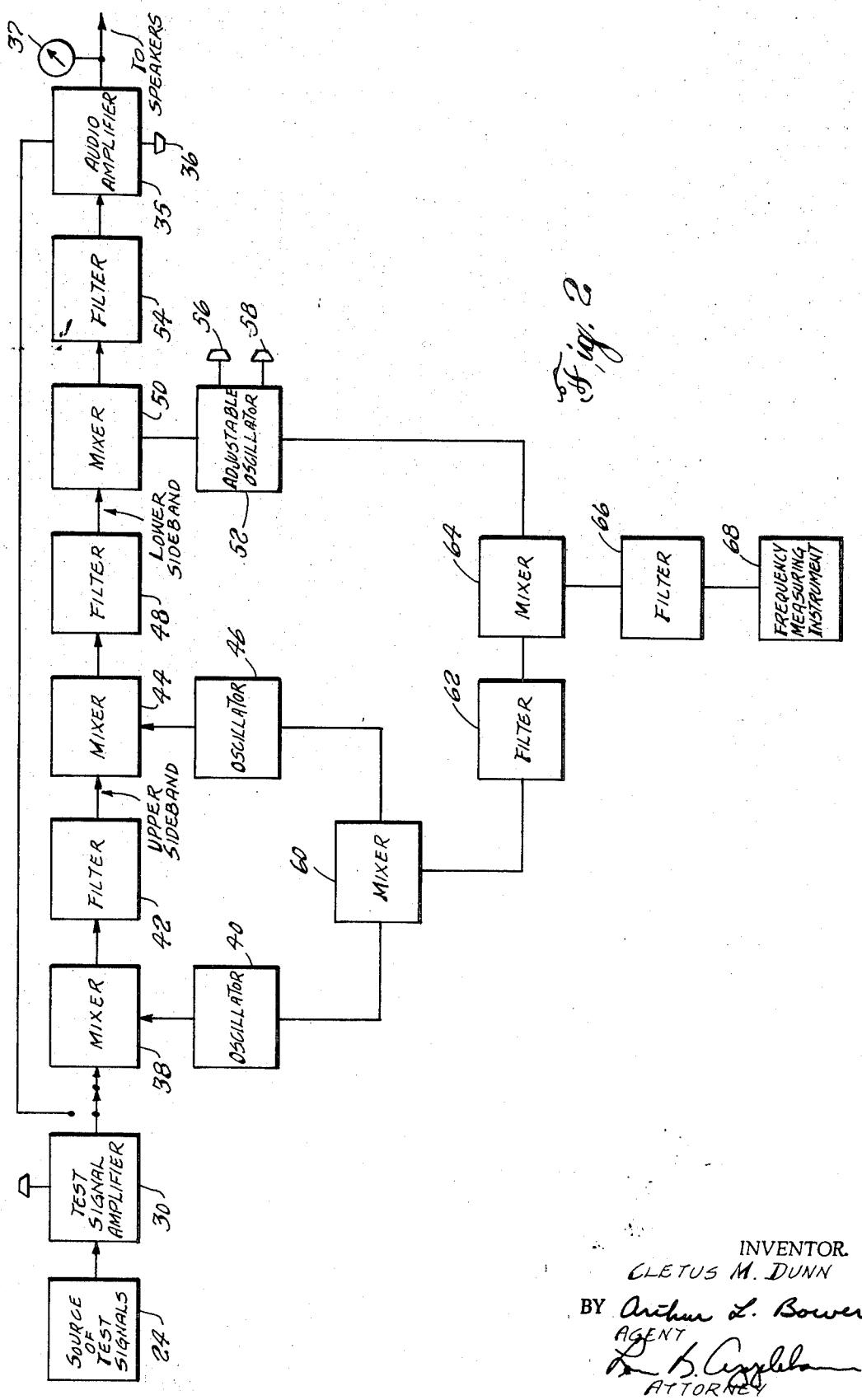
FIG. 2 is a block diagram of elements equipping the locations shown in FIG. 1.

The embodiment of the invention shown in FIGS. 1 and 2 includes a sound-isolated test chamber 10 that contains a test console 12 and an acoustician's post 14 that may be a sound isolated chamber and that includes an acoustician's console 16. Though it may be helpful to the acoustician to be sound isolated, he can carry out his task even if the console 16 is in an open area. The consoles 12 and 16 are equipped with an intercom system 17 to enable the acoustician to instruct or advise a test candidate in chamber 10 during the course of a test and to enable the test candidate to ask a question or to state that he has completed a step in the test. The test circuitry is in one of the consoles or partly in one and partly in the other console. The console equipments are coupled by cable 18. The test console 10 is equipped with hi-fi speakers 20 and/or headphones, not shown, and the acoustician's console 16 is equipped with hi-fi speakers 22.

The test circuit includes a source 24 of test signals. The source 24 may be a calibrated adjustable audio oscillator with a frequency control dial, not shown, on the acoustician's console to generate pure tones. Since the test involves exposing the test candidate to a number of signals that can be obtained from tape recordings, the source 24 may be one or more multichannel tape playback machines with a predetermined test signal recorded on each channel. The acoustician's console panel is provided with a series of channel selector switches 28. Several channels have recorded thereon selected pure tones. Other channels have recorded thereon combinations of one of the same pure tones plus one or more other interfering tones and in selected instances with a noise background, all in predetermined intensity relationship. Other test signals may include a series of short tone pulses wherein successive pulses are slightly higher or lower in pitch to simulate doppler shift in sonar listening, a swept one of such narrow bandwidth that at least some test candidates would not recognize that it is a swept frequency and would be unable to identify whether the tone pitch increases or decreases; another signal may be a piece of music that can be shifted in frequency by the acoustician to be corrected by the test candidate.

A test signal amplifier 30 having a volume control 32 is coupled to the output of the test signal source 24. A three position switch 34 on the acoustician's console either connects the output of the signal amplifier 30 either to the input of hi-fi audio amplifier 35 having a volume control 36 on the acoustician s console or to a multistage heterodyning circuit, or disconnects the signal amplifier from both. An intensity meter 37 indicates the signal intensity level at the speakers. The first heterodyning stage of the heterodyning circuit includes a double-sideband suppressed carrier mixer 38, an oscillator 40, and a filter 42 which provides the upper sideband only. The upper sideband from the first heterodyning stage is delivered to a second heterodyning stage that includes double sideband suppressed carrier mixer 44, oscillator 46 and filter 48 which delivers the lower sideband of mixer 44 to a third heterdyning stage that includes a double sideband suppressed carrier mixer 50, oscillator 52, and filter 54, which delivers the lower sideband of filter 54. The oscillator 52 has two independent frequency controls 56, 58 on the respective consoles and that may be connected in parallel in the oscillator. The oscillator 52 has a balance frequency between its operational limits which added algebraically to the frequency of oscillator 46 equals the frequency of oscillator 40, and when oscillator 52 is set at that frequency, the output of filter 54 has the same frequency character as the input to mixer 38. The deviation from balance frequency at oscillator 52 is the frequency deviation of the output of filter 54 relative to the input to mixer 38.

The frequency deviation at the output of filter 54 relative to the input to mixer 38 may be measured with a metering arrangement coupled to oscillator 52 for indicating the difference between the actual frequency output of oscillator 52 and the balance frequency. However, for greater accuracy the frequency deviation is metered by a two-stage heterodyning arrangement that includes a mixer 60 and a filter 62 that couples the difference frequency of the outputs of oscillators 40 and 46 to the mixer 64 where it is mixed with the output of oscillator 52 and the difference frequency is coupled by filter 66 to a frequency measuring circuit 68 that includes a meter 70 located on the acoustician's console.

The frequencies of oscillators 40 and 46 and the frequency range of oscillator 52 are unrelated harmonically and differ sufficiently in frequency to avoid unwanted interference from beat notes between the translating carriers. The test signal limits are 0–20,000 hertz. One example of oscillator frequencies chosen at random out of the many possibilities is 413 kHz from oscillator 40 and 298 kHz from oscillator 46, for which the difference frequency is 115 kHz. Assuming a pure tone $f_{(t)}$ at the input to mixer 38, the output from filter 42 is the upper side tone, which is 413 kHz + $f_{(t)}$. At the output of filter 48 there is obtained the difference side tone 413 kHz + $f_{(t)}$ − 298 kHz, which is equal to 115 kHz + $f_{(t)}$. At the output of filter 54 is obtained the difference side tone 115 + $f_{(t)}$ − $f_{(adj)}$, the latter being the frequency of adjustable oscillator 52. If the frequency of the adjustable oscillator were set to a frequency equal to 115 + 2$f_{(t)}$ to provide signal tone $f_{(t)}$ at the output of filter 54, the frequency measuring instrument 68 would register incorrect test results. Therefore, the adjustable oscillator 52 should be adjusted from the low frequency end of its range upwardly. After oscillator 52 is adjusted by the test candidate, frequency deviation, if any, is indicated by frequency measuring instrument 68.

The frequency measuring circuit is calibrated easily. When there is no input signal to mixer 38, which is equivalent to zero frequency, there is no output from filter 54 regardless of the setting of adjustable oscillator 52, disregarding circuit noise. The output frequency of oscillator 52 will beat with the difference of the frequencies of the outputs of oscillators 40 and 46. If a frequency monitor is converted to the output of mixer 64, the audio frequency difference will be heard and the oscillator 52 can be tuned to zero beat, after which the frequency indicia are set correctly. The frequency measuring instrument 68 is calibrated by coupling to a precise frequency source.

OPERATION

The test candidate goes into the test chamber and the acoustician at his console issues instructions through the intercom and turns on a pure tone by means of a switch 28. An audiogrammetric analysis may be carried out by determining the candidates sensitivity to selected pure tones across the audio band by setting switch 34 to deliver the test signals to audio amplifier 35 directly and by adjusting volume control 36 during each tone and reading the audibility threshold level on meter 37. Communication is by intercom. Pitch perception is measured by use of several tests. One test is for the acoustician to operate a switch 28 that selects a pure tone and switch 34 to deliver that tone to audio amplifier 35. After a brief interval, the acoustician advises the test candidate that the next tone he will hear is to be corrected to the one he just heard. The acoustician opens switch 34 and modifies the preceding tone by adjusting his control 58. The switch 34 then is operated to couple the signal to mixer 38. The test candidate adjusts the tone pitch with his control 56 to reproduce the previous tone and advises the acoustician. The acoustician records the pitch deviation on meter 70 and then may adjust his control 58 so that the correct frequency is heard by the test candidate. The same steps are repeated for a series of tones. Other tests concern coupling from source 24 to audio amplifier 35 several bars of a piece of music repeated over and over e.g., from an endless tape and then changing pitch with control 58 and coupling the same music to mixer 38 and requiring the test candidate to shift the frequency of the music he hears to the correct frequency band. The frequency deviation is measured as before. In another test, the acOustician closes switch 34 to audio amplifier 35 directly and operates a switch 28 that causes source 34 to deliver a succession of pulses of a pure tone. Then the acoustician terminates that signal and either reintroduces the same signal or selects a companion signal with another switch that couples in a succession of pulses which differ in frequency by a marginal amount and requires that the test candidate state whether the latter signal is the same or includes a doppler shift upward or downward.

In an alternative form of the invention, the oscillator frequency from oscillator 40 is not completely attenuated in suppressed-carrier mixer 38 or the oscillator frequency from oscillator 46 is not completely attenuated in suppressed carrier mixer 44, whereby a zero beating feature is recovered or an interfering tone is obtained and its amplitude may be adjusted so as to measure masking phenomena, tone deafnesses and most of the common pscho-acoustic audiogrametric diagnostic.

This invention has application where zero beat techniques of the prior art are not adequate. It provides objective measurements where prior art techniques relied upon subjective judgment.

Obviously many modifications and variations of the present invention are possible in the light of the above teachings. It is therefore to be understood that within the scope of the appended claims the invention may be practiced otherwise than as specifically described.

I claim:

1. A facility for testing hearing qualifications of a candidate for sonar operator comprising
   a soundproof chamber for a test candidate,
   an acoustician's post,
   an intercom linking the chamber and acoustician's post,
   hi-fi speakers in the chamber and at the acoustician's post connected in parallel,
   a hi-fi audio amplifier for the speakers with a volume control at the acoustician's post,
   an intensity meter connected to the output of the audio amplifier and located at the acoustician's post,
   a source of test signals providing standard tones, true tones and sounds translated in frequency spectrum to make them unrecognizable in relation to the true tones and selector means at the acoustician's post for selecting one test signal,
   a multistage single sideband heterodyning circuit coupled to the input of the audio amplifier and including independent frequency adjusting means for the last stage of the heterodyning circuit located in the chamber and at the acoustician's post,
   a selector switch at the acoustician's post for coupling the selected test signal into the single sideband heterodyning circuit or into the audio amplifier, and
   a frequency metering circuit for indicating at the acoustician's post the frequency deviation between input to and the output of the heterodyning circuit.

2. A testing facility as defined in claim 1 wherein said single sideband heterodyning circuit includes
   three heterodyning stages, and each stage includes a double sideband suppressed carrier mixer, an oscillator coupled to the mixer and a filter coupled to the output of the mixer for transmitting only one sideband,
   the oscillator of the third stage having an intermediate frequency which is equal to the algebraic difference of the frequencies of the oscillators of the first and second stages respectively.

3. A testing facility as defined in claim 2 wherein the frequencies of any two oscillators of the three stages are unrelated harmonically and differ sufficiently in frequency as not to produce a beat in the audio range.

4. A testing facility as defined in claim 3 wherein the filter of the first stage of the heterodyning circuit transmits the upper sideband and the other two filters select the lower sideband.

* * * * *